United States Patent [19]
Davis

[11] 3,918,280
[45] Nov. 11, 1975

[54] MACHINE WORK TRANSFER APPARATUS

[76] Inventor: Charles R. Davis, Rte. 1 266 River Oaks Drive, Reeseville, Wis. 53579

[22] Filed: July 3, 1973

[21] Appl. No.: 376,241

[52] U.S. Cl. ..................................... 72/22; 72/426
[51] Int. Cl.² ........................................... B21J 7/46
[58] Field of Search ............ 72/421, 422, 426, 427, 72/344, 361, DIG. 11, 22, 24, 25, 346; 113/113 R, 113 D; 83/81, 82, 157

[56] References Cited
UNITED STATES PATENTS

| | | | |
|---|---|---|---|
| 1,254,441 | 1/1918 | Selkirk | 72/345 |
| 2,145,606 | 1/1939 | Megela | 72/422 |
| 2,377,262 | 5/1945 | O'Leary | 83/81 |
| 2,433,066 | 12/1947 | Rund | 113/113 R |
| 3,052,143 | 9/1962 | Cooley | 83/112 |
| 3,192,750 | 7/1965 | Richardson | 72/22 |

FOREIGN PATENTS OR APPLICATIONS

| | | | |
|---|---|---|---|
| 578,648 | 6/1959 | Canada | 72/426 |

*Primary Examiner*—C. W. Lanham
*Assistant Examiner*—Robert M. Rogers
*Attorney, Agent, or Firm*—Andrus, Sceales, Starke & Sawall

[57] ABSTRACT

A movable tray apparatus moves horizontally between the vertically moving die elements of a press to minimize the space requirements. Retraction of the tray support provides automatic discharge of the work along the direction of movement of the tray. The tray apparatus may be a rigid member, pivotally mounted adjacent the leading edge and supported on the under surface by one or more wheels. Full retraction aligns the pivot structure with the wheels and the tray automatically pivots downwardly to discharge the work. The tray apparatus may also be a flexible belt having a leading end connected to the movable rail with the trailing end wound upon a roller. Retraction essentially completely rolls the work supporting surface upon the roller and drops the work from the belt onto an inclined chute.

6 Claims, 11 Drawing Figures

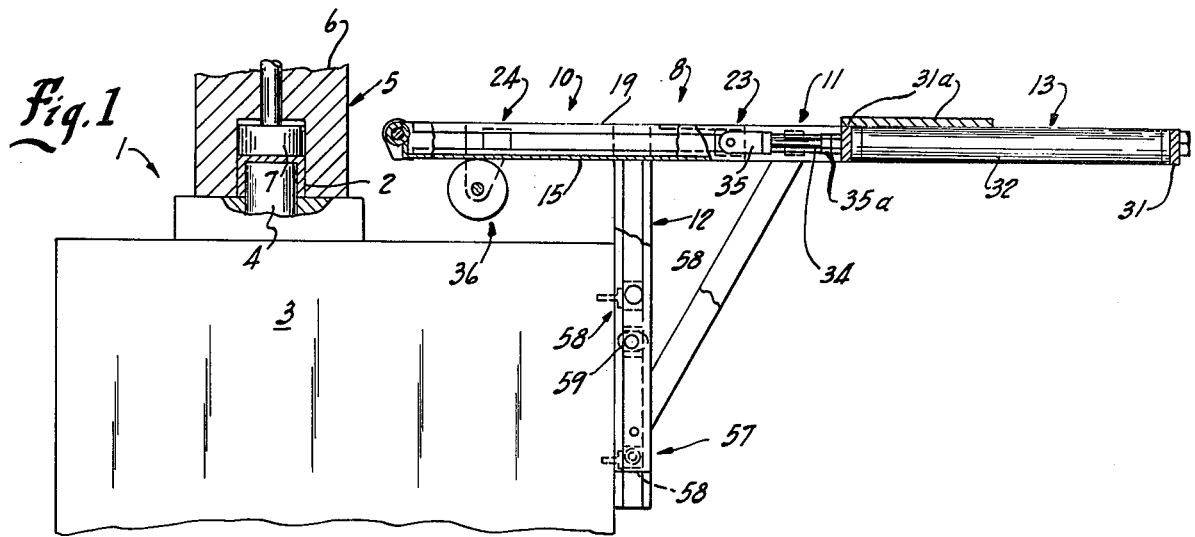
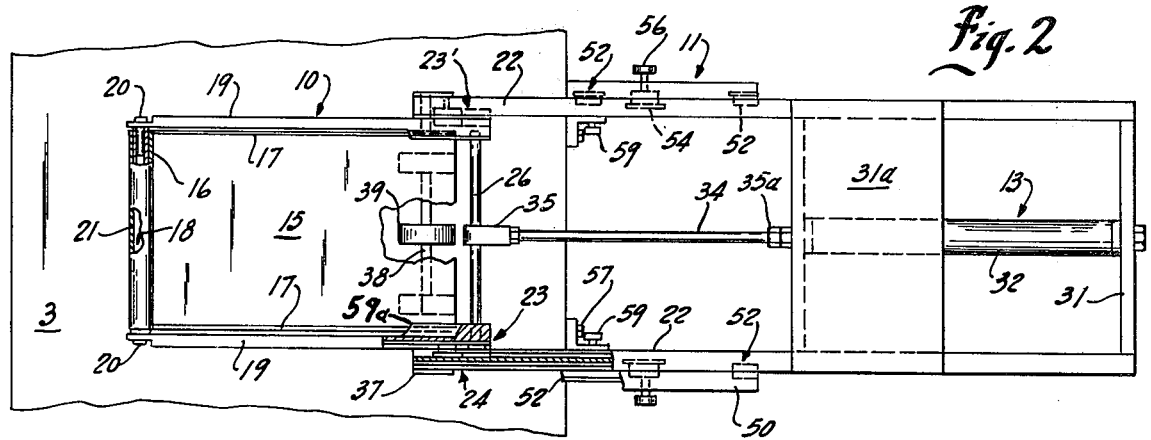
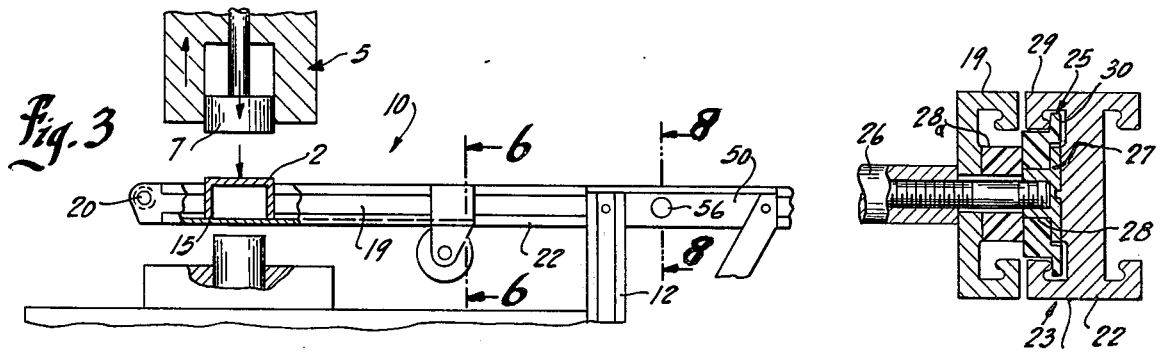
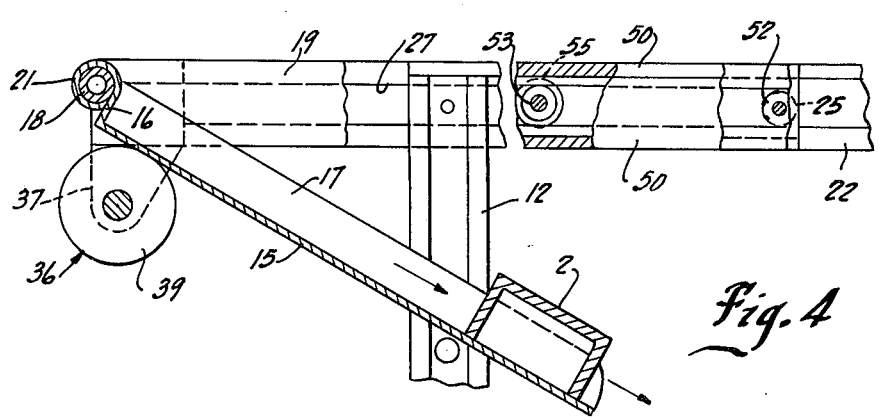

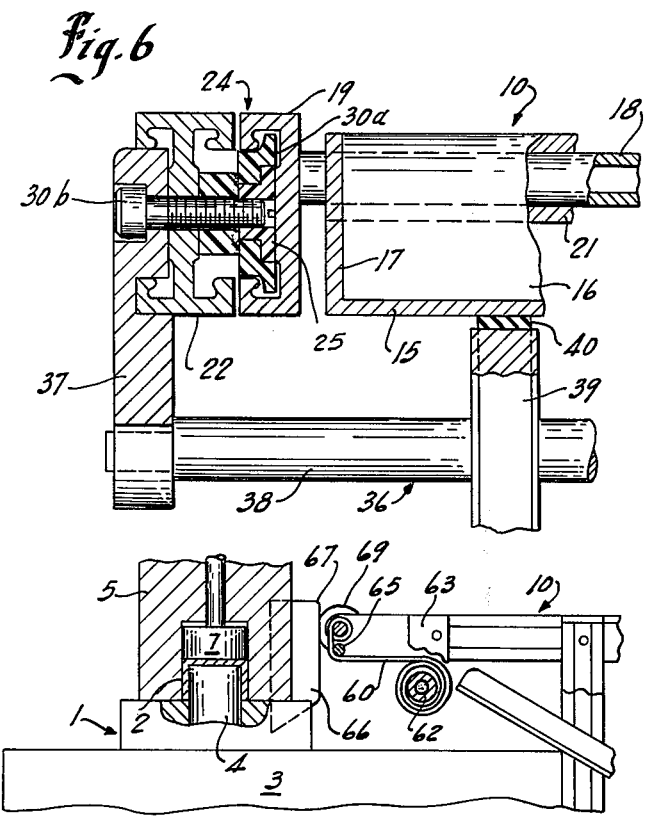
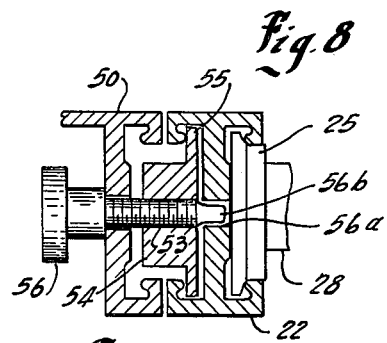
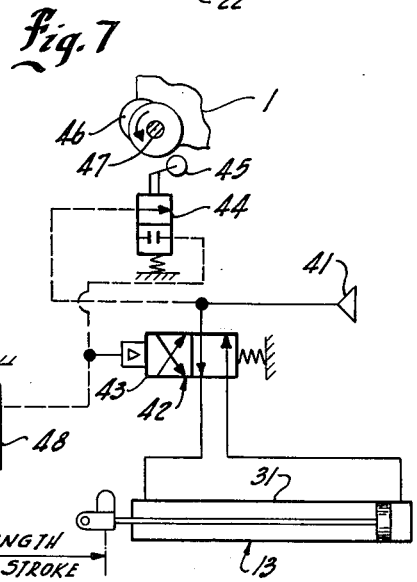
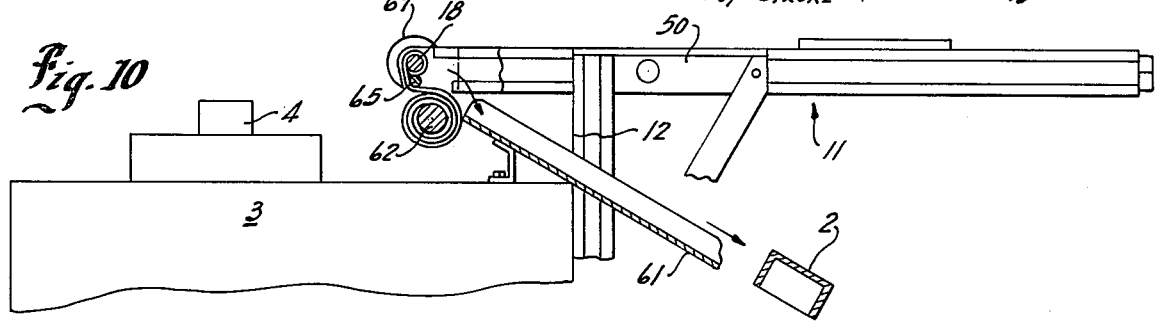
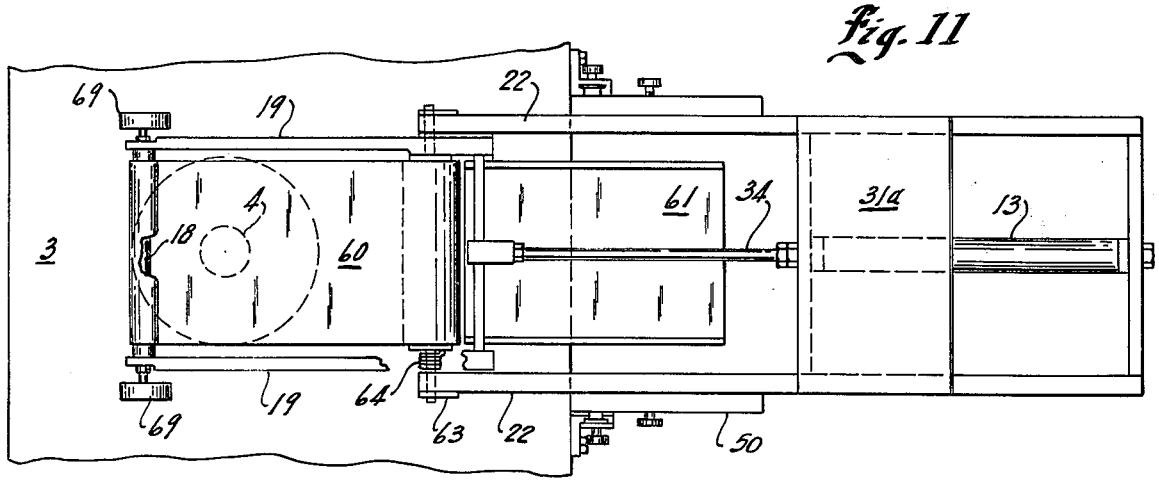

MACHINE WORK TRANSFER APPARATUS

BACKGROUND OF THE INVENTION

This invention relates to a machine work transfer apparatus and particularly to material transfer apparatus for automatically transferring of a work member with respect to a cyclically operable machine element such as the die element of a press.

Automatic machines for forming, manipulating of or otherwise processing work pieces in timed sequence may be constructed to operate at relatively high speeds with automatic introduction and removal of the work pieces. For example, in punch presses, articles such as cup-shaped members may be formed by relatively moving a pair of suitable vertically movable die members between a opened and a closed position with a blank formed by the die closure. Raising of the punch element carries the formed member with it which is automatically removed by a suitable stripping mechanism. The apparatus or machine, of course, desirably provides for automatic removal of the formed member from the press with the ejection or stripping operation to permit the continued operation of the machine without the necessity of manual unloading. Various reciprocating unloading devices may have been suggested for introduction between the die elements to automatically catch and remove the stripped part, generally by having an inclined unloading surface. For example, a sliding discharge system is shown in U.S. Pat. No. 3,653,293. U.S. Pat. No. 2,377,262 suggests a mechanically driven two position slide which is tilted as it moves from the loading position.

In relatively slow speed operations, the removal may, of course, be readily accomplished with many different forms of transfer mechanisms. However, in high speed press operations special care must be taken to prevent interference between the removal mechanism and the die elements. Thus, should the press mechanism in any way engage the transfer mechanism or the working elements of the press engage the mechanism, severe damage can be anticipated. An inclined removal element of course require a relatively wide opening to accommodate the increased vertical depth of the inclined surface.

There is, therefore, a demand for a rapidly acting removal structure which can be introduced between the die units with a minimum danger of interference between the unit and the apparatus, while providing reliable work removal.

SUMMARY OF THE INVENTION

The present invention is particularly directed to a gliding tray type apparatus for movement between the die elements on a path which is essentially normal to the direction of the working elements to minimize the space requirements therebetween to prevent interference, and incorporating means for rapidly discharging of the work piece. Generally, in accordance with the present invention, a horizontal support assembly is mounted in a support for movement along the path essentially normal to the path of the working elements of the forming apparatus or the machine apparatus. The support assembly is generally in the form of a type of assembly which is maintained with a minimum vertical depth to minimize the entrance space requirement and is further actuated directly through a rapid acting fluid or similar drive system to move rapidly between a pickup and a discharge position. The apparatus further includes means for automatically discharging of the work piece generally along the direction of movement of the tray assembly and preferably by discharging of the work through a gravity chute type discharge means.

In accordance with the present invention, the tray assembly is selectively positioned between a position with the tray assembly spaced from the working elements of the machine apparatus to permit normal operation of the machine. As the working elements separate to expose the work piece, the tray assembly automatically moves forwardly into a pickup position and, before the machine returns to the working stroke, the tray assembly is rapidly retracted to a discharge position, with the movement providing for an automatic and rapid transfer of the work piece from the tray assembly.

In one particularly novel embodiment of the invention, the tray assembly includes a rigid tray member which is pivotally mounted adjacent the leading edge and is supported on the under surface by a suitable relatively stationary pivot structure, such as one or more supporting wheels. The forward movement into the pick-up or loading position of the tray member maintains the trailing end of the tray member on the pivot support. The full retraction to the discharge position, however, moves the tray member with the leading portion aligned with the pivot structure and the tray automatically pivots downwardly about the pivot mounting to discharge the work piece.

An intermediate positioning of the tray assembly may be provided which locates the pivot structure adjacent an intermediate position of the tray member to hold the tray member in a horizontal supporting position while locating the leading edge of tray member closely adjacent to the working elements. This would minimize the travel from standby to the loading position.

In an alternative construction, providing essentially the same type of removal action, the tray assembly includes a flexible supporting surface having a leading end connected to a support, the trailing end of which is wound upon a supporting roller or otherwise mounted for movement from the supporting plane. In the intermediate position, if used, the surface is partially rolled on the roller. Extension of the slide support, unrolls the supporting surface with movement in between the die assembly to pick-up the work piece. Retraction past the intermediate position to the discharge position, essentially completely rolls the work supporting surface upon the roller thereby carrying the work piece to the very discharge end of the support structure and dropping it onto a discharge system such as an inclined chute or other suitable discharge device.

If desired, a sensing system may, of course, provide a means to sense the position of the die to ensure a required opening for accepting of the work member. The gliding tray structure also permits very convenient mounting of the assembly through the use of adjustable sliding elements with suitable locking means for locking of the tray structure for appropriate positioning and movement. The tray assembly further preferably includes a vertical positioning system which permits the accurate placement of the horizontally disposed structure for accurate placement with respect to the moving dies.

Thus, the present invention provides for the very convenient and reliable placement of the transfer tray assembly for minimum spacing from the pick-up position which minimizes the total pick-up and removal stroke and thereby the critical time requirements. Further, the use of a fluid cylinder drive system or the like permits the very rapid movement of the unit while minimizing the possibility of interfering action.

BRIEF DESCRIPTION OF DRAWINGS

The drawings furnished herewith illustrate the best mode presently contemplated for carrying out the invention as described hereinafter.

In the drawings:

FIG. 1 is a fragmentary side elevational view of a press and press unloader or work removal apparatus constructed in accordance with the teaching of the present invention with the unloader moving to an unloading position;

FIG. 2 is a top elevational view of the unloader structure taken on line 2—2 of FIG. 1 in the loading position;

FIG. 3 is a view similar to FIG. 1 showing the unloader in the loading position for receiving of the work member from the illustrated press assembly;

FIG. 4 is an enlarged fragmentary view showing details of the unloading apparatus in the discharge position.

FIG. 5 is a fragmentary vertical section taken generally on line 5—5 of FIG. 4 and illustrating a gliding support for one end of a telescoping frame for the illustrated embodiment of the invention;

FIG. 6 is a view similar to FIG. 5 illustrating the gliding support for the opposite end;

FIG. 7 is a schematic diagram of a fluid control system;

FIG. 8 is a view taken generally on line 8—8 of FIG. 3 illustrating the rail locking unit shown in FIGS. 1–4;

FIG. 9 is a view similar to FIG. 1 and illustrating an alternative embodiment of the invention;

FIG. 10 is a view showing the collapsed discharge position of the structure shown in FIGS. 9 and 10; and FIG. 11 is a top plan view illustrating the modified structure in position to receive a work piece.

DESCRIPTION OF THE ILLUSTRATED EMBODIMENT

Referring to the drawings and particularly to FIGS. 1 and 2, the present invention is shown applied to a punch press unit 1 which is adapted to form a cup-shaped part 2. The press generally includes a supporting base 3 having a suitable lower die 4. An upper die 5, shown as a die punch, is secured to a vertically reciprocating or moving ram 6 which is adapted to move downwardly forming a metal blank about the lower die 4 to form the cup-shaped part 2. The upper die element 5 carries the formed part 2 upwardly into the upper die assembly where it is automatically removed by movement into a suitable stripper 7 for gravity discharge to a special unloader apparatus constructed in accordance with the present invention.

In the illustrated embodiment, the press unloader apparatus 8, shown in FIGS. 1 and 2, generally includes a tray assembly 10 mounted for horizontal gliding movement within a glide mounting framework 11 and including a pair of vertical brackets 12 secured to the press base 3, as hereafter described. A fluidic drive unit 13 is mounted within the framework 11 to the tray assembly 10. The drive unit 13 is actuated to provide rapid and predetermined reciprocal movement with respect to the punch press unit 1 and in particular between distinct positions including an initial starting or standby position with the tray assembly 10 spaced to the die elements 4–5, as shown in FIGS. 1 and 4. The assembly 10 is movable therefrom to a load receiving position, as shown in FIGS. 2 and 3, where the tray assembly 10 is located between the opened or spaced dies 4 and 5 to receive the formed work piece or part 2. In the fully retracted starting position, as shown in FIG. 4, the part 2 automatically discharges. The assembly 10 then remains in the standby or discharge position illustrated in FIG. 4 after discharge of the part 2. Applicant has found that the horizontal positioning and rapid movement into a removal position and retracted to a discharge position provides a highly reliable and effective means for receiving and discharging of the formal part 2.

More particularly, in the embodiment of the invention illustrated in FIGS. 1 and 2, the tray assembly 10 includes a flat plate-like tray member 15 having a forward wall 16 and a pair of sidewalls 17. The forward wall 16 is pivotally mounted by a shaft 18 which is fixed at the opposite ends between a pair of gliding rails 19. Thus the shaft 18 may be a tubular member with securement pins 20 projecting through the rails 19. The illustrated tray member 15 is generally a sheet metal member having the upper edge of the front wall 16 bent around the tube or shaft 18 as at 21 and journaled thereon to pivot on the shaft 18.

The forward or front portion of the tray member 15 is moved with the gliding rails 19 which are glidably supported upon a pair of relatively fixed support tracks or rails 22 forming a part of the framework 11 and connected to the vertical supporting brackets 12.

In the illustrated embodiment of the invention, the gliding rails 19 are similarly supported and the structure of one rail is described with corresponding elements of the other rail 19 identified by similar primed numbers.

Thus, rail 19 is supported by a pair of similar longitudinally spaced support units 23 and 24 each employing a similar glide wheel construction, as shown in FIGS. 5 and 6.

As most clearly shown in FIGS. 2 and 5, unit 23 is secured to the trailing end of the tray rails 19 and each includes a wheel 25 formed of a suitable plastic material and mounted to provide a rolling or gliding support and movement in rail 22.

A drive cross brace 26 as a tubular shaft extends between the side rails 19. The opposite ends of the shaft projects through the rails 19 with the wheel 25 locked on the outer end. As most clearly shown in FIG. 5, the end of brace 26 includes a threaded stud extending through rail 19 to receive a clamping nut 27 which has a bearing hub 28 projecting through the wheel 25. A spacer 28a is located between the sidewall of rail 19 and the wheel 25 to locate the wheel within the support rail 22. The side rail 22 is shown including an inwardly facing channel track defined by top and bottom flanges 29 spaced from the sidewall or base and with inwardly projecting guide flanges 30. The wheel 25 has a diameter generally corresponding to but preferably slightly less than the spacing of flanges 29 and with a wheel flange 30 located between the rail base and the flanges 29. With the wheel 25 slightly smaller than the flange spacing, the wheel rides on the lower or upper flange of the rail. This minimizes the drag on the assembly and permits smooth, rapid movement. The wheel 25 is thus rotatably mounted on the hub 28 which defines the load supporting and wear surface. A ball bearing means may be employed if desired. Further, the wheel flange 30 is preferably formed with a slight taper as shown, such that the engagement with the track flanges 29 is essentially only at the curved junction of the flange and load surface.

The front support unit 24 is similarly constructed as shown in FIG. 6 with a wheel 30a similarly secured by a clamping screw 30b to the side rail 22 and with wheel 30a appropriately located within the rail 19. Thus the cross-section of rail 19 defines a similar track opening outwardly in opposed relation to the track on rail 22.

The tray assembly 10 is selectively positioned by the fluid drive means 13 shown as a pneumatic cylinder unit 13 mounted between the outermost portion of the framework 11 and particularly the fixed rails 22. The rails 22 project outwardly of the press unit 3 and are connected at the outermost ends by a cross brace 31 and at an intermediate location by a plate 31a having a depending vertical wall extending between the rails. The power drive unit 13 includes a cylinder 32 mounted in fixed relationship between the rear cross brace 31 and the vertical wall of the intermediate support plate 31a. A piston shaft 34 projects forwardly from the cylinder 32 with the outermost end secured as by a suitable coupler 35 to the cross shaft 26 on the outermost end of the movable rails 19. The cylinder unit 13 is selectively pressurized to position the tray assembly 10 in the alternate positions illustrated in FIGS. 3 and 4 by correspondingly positioning of the movable glide rails 19 within the fixed glide rails 22. In the position of FIG. 4, the coupler 35 abuts the forward mounting of the unit 13 and a bumper 35a may be provided in such case to absorb the shock forces, if any.

The forward end of the fixed rail 22 is further provided with a sliding pivot support shown as a wheel assembly 36 located to selectively support the tray assembly in a horizontal plane and thus normal to the movement of die 5 in the intermediate standby position of FIG. 1 and in the loading or work receiving position of FIG. 3. The assembly 36 also permits the tray assembly 10 to automatically pivot downwardly upon full retraction to the discharge position of FIG. 4.

As most clearly shown in FIG. 6, the wheel assembly 36 includes similar depending wheel brackets 37 secured to the opposite fixed rails by the wheel mounting pins or shafts 26. A wheel support shaft 38 is mounted or secure to the depending brackets 37 and one or more wheels 39, shown as three in the illustrated embodiment of the invention, are rotatably journaled on the shaft, with appropriate axial spacing beneath the tray 15 when a plurality of wheels are employed. The periphery of each wheel 39 is preferably provided with a suitable shock absorbing or other similar resilient material 40 to provide a relatively silent and low friction support for the tray 15 as it moves across and on the wheels 39.

The wheels 39 are selected to have the upper periphery located in a common plane with the lower plane of the tray 15 when the latter is disposed in the horizontal position of FIGS. 1 and 3. As the tray assembly 10 is extended from the standby position, the trailing portion of the tray 15 moves over the wheels 39, but not beyond the wheels and thus is maintained in a horizontal position to receive the formed part or work piece 2, as shown in FIG. 3. In the fully retracted position of FIG. 4, the forwardmost portion of the tray 15 is aligned with the wheels 39. This permits the tray 15 to pivot about the axis of shaft 18 to the illustrated discharge position.

Although any suitable valving system can, of course, be employed a particularly satisfactory system is illustrated schematically in FIG. 7. The cylinder unit 13 is actuated from a suitable regulated air supply 41, shown in block diagram, with main valve means 42 selectively connecting the air pressure side and the exhaust side of the supply to the opposite ends of the cylinder 31. A fluid logic and pilot valve control system is coupled to valve means 42 to move the tray assembly 10 between the loading and discharge positions of FIGS. 3 and 4.

The main valve means 42 is provided with spring-return air operator 43. A first pilot valve 44 connects the operator 43 to the supply 41. The pilot valve 44 includes mechanically actuated operator 45. The valve 44 is mounted on the press with the operator 45 in the path of a cam or lobe 46 on the press crankshaft 47, as diagrammatically shown in FIG. 6. Thus, as the press unit moves to the full open position, the lobe 46 momentarily activates valve 44 to apply pressure to air operator 43 and thereby reverse the position of valve 42. The air supply 41 is now connected to the outer end of cylinder unit 13 while the inner end is connected to exhaust. The cylinder unit 13 thereby causes the piston and shaft to move rapidly outwardly to the loading position of FIG. 3. A second similar pilot valve 48 is mounted in the path of the tray unit or piston shaft, as shown. The valve 48 is connected to automatically return to the illustrated full line position. The pilot valve 48 may, of course, be replaced with an internal valving arrangement. For example, a bleed valve with a snap action response at a selected pressure may couple a pressure tank to the valve unit 42 to provide a timed operation. Thie action again reverses the connection to the air cylinder 31 and supplies air to the forward end of the cylinder 31 thereby rapidly causing the retraction of the tray 10 to the fully retracted position of FIG. 4, with the piston shaft collapsing within the cylinder to the rearwardmost position, shown in FIG. 6. The tray 15 pivots to discharge the part 2 and stops, with the inertia force of the part maintaining the discharge movement as the result of the discharge along the line of tray movement. In the illustrated embodiment of the invention, valves 42 and 48 and associated operating mechanism may be secured to the transverse cylinder support plate 32.

The tray assembly 10 is preferably adjustably supported for horizontal positioning relative to die elements. In the illustrated embodiment, as most clearly shown in FIGS. 2 and 4, the relatively fixed rails 22 are symmetrically formed with similar inner and outer tracks and are adjustably attached to horizontal support tracks 50. The tracks 50 are, in turn, connected to the upper end of the vertical bracket 12 and extending outwardly therefrom with a strengthening brace 51 connected between the outer end of the track 50 and the lower portion of the corresponding vertical bracket 12.

More particularly, fixed support rail 22 is secured to the upper track 50 with a pair of spaced support discs 52 located within the outwardly facing track portion of rail 22. Discs 52 generally have a diameter corresponding to the track opening to provide a locating support of the rail 22.

The rails 22 are horizontally positioned with respect to the press unit and they are clamped in place by a clamping unit located between the support discs 52 and attached to the fixed support track 50, as most clearly shown in FIG. 8. A clamping bolt 53 is threaded into a flanged disc 54 having a flange 55 located within the outer track portion of rail 22. Bolt 53 extends through an opening in the track 50 to the disc 54, with a knurled knob 56 fixed to the outer end of the bolt 53. Tightening of the bolt 53 pulls the flange 55 outwardly and exerts a clamping force on the fixed glide rail 22 and locks the rail 22 in the desired spaced relation to the die elements. The rails 22 may be provided with a plurality of appropriately spaced, locating openings 56a and the clamping bolt 53 provided with a locating non-threaded projection 56b mating with such opening for properly locating of the rails 22.

The present invention provides a means for rapidly positioning of a gliding type tray assembly 10 into a work receiving position and removing thereof to a fully retracted position for the rapid and reliable removal of the work member. The horizontal positioning of the device and the use of a gliding tray arrangement permits the placement with a minimum die opening and minimizes the danger of interference between the glide and the work member. This, of course, also requires relatively accurate vertical adjustment of the tray assembly to position the tray perpendicular to the die elements and closely adjacent the lower stationary die.

The press mounting system is adjusted for accurate vertical and horizontal positioning of the tray assembly 10 to maintain optimum operation of the tray 15 during loading and unloading, as follows.

In the illustrated embodiment of the invention, the pair of vertical mounting brackets 12 of framework 11 are adjustably secured to the press base 3 by a support bracket or unit 57, such as that shown for the rails 22, as shown in FIGS. 1 and 2. Thus a pair of locating discs 58 are shown secured to brackets 57 and project outwardly into corresponding grooves in bracket 12. The vertical brackets are oppositely grooved to provide a support similar to that shown in FIG. 5. An intermediate clamping block assembly 59 similar to that shown in FIG. 7, is also shown for locking of the vertical bracket 12 onto the support bracket 57 to lock the assembly in position with the rails 22 located to support the tray assembly 10 in alignment with the die element. The bracket 57 is bolted or otherwise secured to the press base 3, as shown.

The operation of the press 1 and the operation of the unloading apparatus 8 is briefly summarized as follows. The tray assembly 10 starts in the standby and unloading positions of FIG. 4 with the leading wall 16 of the tray 15 spaced from the moving die elements 5 of the tray 15 and with the tray 15 tilted to the discharge press unit 1 and with the tray 15 tilted to the discharge position on the wheels 39. As the die 6 opens, switch 44 is actuated and the cylinder 13 operates to rapidly move the tray 15 to the loading position of FIGS. 2 and 3, with the trailing portion of the tray 15 supported on the wheels 39 to establish the horizontal positioning. The work piece 2 rapidly drops onto the tray 15 which is automatically retracted, carrying the formed part 2 with it. The terminal portion of the retraction movement again aligns the tray forward wall 16 with the wheels 39 and the tray 15 automatically pivoting downwardly about the axis of shaft 18 to the discharge position, with the work piece 2 rapidly moving from the tray 15. The tray 15 stops, but the incline and momentum of the part 2 provides for rapid discharge. The tray assembly 10 is again in the standby position.

The tray assembly 10 rapidly returns to the horizontal position and may tend to over pivot upwardly of the rails 19. The outer end of the rails are, therefore, shown with lateral ledges 59a projecting inwardly over the innermost ends of the tray sidewalls 17, as shown most clearly in FIG. 2, to prevent such movement. If part 2 does not discharge of any reason, any over pivoting on return would tend to throw the part toward the press with further damaging consequences. The stop means prevents this unacceptable occurrence.

An alternative embodiment of the invention is shown in FIGS. 9–11. The alternative embodiment employs a similar mounting means and cylinder drive system and consequently such structure is only shown in FIG. 10 and is not further described. Corresponding elements of the two embodiments are similarly numbered for simplicity and clarity of explanation.

In the alternative embodiment of the invention, the pivoting tray 15 is removed and replaced with a flexible supporting belt 60 which is projected between the dies 4–6 to pick-up the work piece 2 and withdrawn to drop the work on a fixed discharge chute 61.

The illustrated belt 60 is a suitable flexible member which is secured at the forward or leading end to the movable glides or rails 19. The roller 62 is resiliently loaded to wind the belt 60 onto the roller.

More particularly, the roller 62 is mounted between a pair of depending brackets 63 similar to the wheel supporting brackets 37. A coil spring 64 encircles the supporting shaft and is loaded to continuously urge the roller to rotate in a clockwise direction as viewed in FIGS. 9 and 10. The belt 60 is secured to the roller 62 and wound about it in a counterclockwise direction with the outer end secured to the gliding rails 19 in a manner positively preventing the rotation of the roller to relieve the spring tension. The upper periphery of the roller 62 is located generally in the lower plane of the side rails 19 to locate the belt as it leaves the roller in a horizontal plane accurately located with respect to the press unit 1.

The outer end of the belt 60 is secured to the forwardmost end of the movable glide rails 19 and 20. In the illustrated embodiment of the invention, the outer end is wrapped about the shaft 18 which pivotally supports tray 15 as in the previous embodiment. A locating shaft or pin 65 is secured to the forward lower end of the movable rails 19 and the bolt 60 extends about the pin 65 and then upwardly to the shaft 18 to form a forward wall. As the rails 19 move outwardly, the belt 60 unrolls from the roller 62 into a horizontal plane to form a support generally corresponding to that provided by the tray 15, as shown in FIG. 9.

In operation, the rails 19 are retracted and wind the belt 60 on the roller 62 with the forward wall of the belt 60 spaced from the die units 4–5. When the press die 5 opens to reject the member 2, the rails 19 are moved outwardly on the wheel supports to the work receiving position, carrying the belt 60 in between the dies 4–5 to receive the member 2 which drops onto the belt 60. The rails 19 are then fully retracted to the discharge position with the arms to the fully collapsed position shown in FIG. 9. The belt 60 again winds upon the roller 62. The member 2 then drops from the belt through the framework 11 onto the tray 61 or other suitable receiving means which is provided to receive the work piece.

The unloader of FIGS. 9–11 functions to permit the rapid insertion and removal of the pick-up means with the part rapidly removed along the direction of movement of the pick-up means.

Although the flexible support structure is shown wound on a roller any other suitable means of reducing the support surface may, of course, be employed within the concept of the present invention. The illustrated embodiment has, however, been found to provide a very satisfactory unloader.

Further, a stop means, shown as a pair of stop members 66 may be coupled to the opposite sides of the press element 5 to positively hold the tray assembly 10 against movement until the working elements have moved from the path of the unloading structure. The stop members 66 are shown with cam surfaces extending downwardly below the level of the die member 5. A pair of follower wheels 69 are coupled to the opposite sides of the assembly and ride on the cam surfaces. The fluid drive means 13 or the like may be activated to establish the unloader position such as shown in FIGS. 2 or 11. However, the follower wheels 69 engage the stop members 66 which hold the leading edge of the tray assembly 10 in spaced relation until the die member 5 has moved upwardly sufficiently for the assembly 10 to move without damage to any of the working components. This would appear to be particularly desirable in the application to extremely high speed presses and the like.

The load transfer assembly may be held in an intermediate position, such as shown for the belt unit in FIG. 8, by proper fluid controls which simultaneously remove or dump air from the opposite side of the cylinder unit 13, and which will then remain in an intermediate standby position such as shown in FIG. 9. In this position, the assembly is spaced only slightly from the die elements 4–5 and reduces the required movement to the load receiving position. However, Applicant has not found such additional features necessary for practical application. The logic circuitry is more complicated with such an intermediate placement. Further the application of power to the cylinder provides a selected timing. An adjustable stop means may be provided between the rails 19 and 22 to restrict the outward movement to less than full stroke to hold the receiving tray in a loading position, if desired for any reason.

The unloader thus provides for the rapid movement of the work supporting structure between the loading and unloading positions and permits the reliable and positive removal of the member. I claim:

1. An unloading mechanism for a machine having a pair of relatively moving working elements with means for discharging of a work piece normal to movement of the working elements in spaced relation to each other, comprising a flexible member, a support assembly for said flexible member and mounted for movement essentially in a plane normal to the movement of the work elements, said support assembly including a movable leading support means connected to a first inner end of the flexible member and including an outer support means coupled to the opposite outer end of said flexible member and having means establishing a force on said flexible member resiliently urging the movable support means toward the outer support means, means to selectively move the loading support means between a first position spaced from the working elements and a second position with the flexible member between the working elements and carrying the work piece on the flexible member along the direction of movement of the flexible member and over the outer support means to discharge the work piece from the flexible member, and discharge means aligned with the outer support means to receive the work piece.

2. The unloading mechanism of claim 1 wherein said flexible member is a continuous flexible belt.

3. The unloading mechanism of claim 1 wherein said support assembly includes a fixed support and a sliding support movable in said fixed support generally normal to the movement of said working elements, a roller means secured to said fixed support, said flexible support member having a front wall portion secured to the sliding support and extending outwardly therefrom with the outer end secured to said roller means, a resilient drive means coupled to continuously urge the roller to rotate and wind the flexible member thereon, and means coupled to said sliding support to selectively position the sliding support and thereby wind and unwind said member upon said roller means.

4. The unloading mechanism of claim 3 wherein said support assembly including a telescoping support frame within a mounting frame, said support frame including a pair of spaced side rails and front and rear cross members, a second locating member secured to said side rails beneath said front cross member, said flexible member being a belt secured to the front brace member and extending downwardly and about said locating member to said roller means, said roller means being secured to said mounting frame, and a discharge chute means located adjacent to said roller means.

5. The unloading mechanism of claim 1 having a stop means interposed in the path of said support assembly, means coupled to activate the drive means to move the support assembly to said second position, and means to sense the position of the working elements relative to said support assembly to remove the stop means from said path only with the working elements spaced to accept said support assembly.

6. The unloading mechanism of claim 3 wherein said support assembly includes a fixed rail having a wheel track and an opposed movable rail, a wheel assembly including longitudinally spaced wheel means located within the opposed wheel tracks of the fixed and movable rails, said wheel means having opposite end bearing facings and having one wheel means secured to the movable rail and a second wheel means secured to the fixed rail to couple said rails for relative longitudinal movement and having said leading support means connected to the forward end of the movable rail for movement essentially in said plane normal to the movement of the work elements.

* * * * *